United States Patent [19]

Hartitz

[11] Patent Number: 5,026,582

[45] Date of Patent: Jun. 25, 1991

[54] EXTRUDED AMORPHOUS THERMOPLASTIC PIPE HAVING REDUCED INTERNAL STRESS AND METHOD OF MAKING THE SAME

[75] Inventor: J. Ernst Hartitz, Avon Lake, Ohio

[73] Assignee: The B. F. Goodrich Company, Brecksville, Ohio

[21] Appl. No.: 408,964

[22] Filed: Sep. 18, 1989

Related U.S. Application Data

[62] Division of Ser. No. 232,070, Aug. 15, 1988, Pat. No. 4,888,148.

[51] Int. Cl.$^5$ ................................................ F16L 9/00
[52] U.S. Cl. .................................. 428/36.6; 428/36.9
[58] Field of Search ............................... 428/36.9, 36.6

[56] References Cited

U.S. PATENT DOCUMENTS

| | | | |
|---|---|---|---|
| 3,129,461 | 12/1960 | Zavasnik et al. | 26.4/209.1 |
| 3,184,792 | 5/1965 | Commisso | 425/467 |
| 3,187,383 | 6/1965 | Bacchus et al. | 264/209.4 |
| 3,320,637 | 5/1967 | Van Dijk | 425/378.1 |
| 3,871,807 | 3/1975 | Meyniel et al. | 425/71 |
| 4,069,001 | 1/1978 | Carrow | 425/467 |
| 4,152,380 | 5/1979 | Graves et al. | 264/23 |
| 4,314,958 | 2/1982 | Macleod | 264/167 |
| 4,402,658 | 9/1983 | Larsen | 425/467 |
| 4,613,532 | 9/1986 | Michel et al. | 428/36.9 |
| 4,663,107 | 5/1987 | Takada et al. | 425/379.1 |
| 4,749,531 | 6/1988 | Borger et al. | 264/40.6 |

FOREIGN PATENT DOCUMENTS 53-136063 11/1978 Japan .
62-90217 4/1987 Japan .

Primary Examiner—James J. Seidleck
Attorney, Agent, or Firm—Daniel J. Hudak; Thoburn T. Dunlap

[57] ABSTRACT

Physical properties of extruded amorphous thermoplastic pipe are improved by a method of extrusion which allows for relaxation of internal stress introduced during the processing. The stress is relieved by using an extrusion die having an inner and outer diameter which is smaller than the final product inner and outer diameter. The extruded pipe is allowed to expand as a result of melt swell and thereby permit relaxation of internal stresses within the extruded pipe. The expansion brings the inner and outer diameter to approximately the size of the final pipe. The further introduction of internal stress is avoided by pulling the extruded pipe from the extruding apparatus at a rate which is approximately the same as the rate of extrusion. The pipe can undergo a final sizing step to bring the extruded pipe to the final product size.

3 Claims, No Drawings

EXTRUDED AMORPHOUS THERMOPLASTIC PIPE HAVING REDUCED INTERNAL STRESS AND METHOD OF MAKING THE SAME

This is a division of application Ser. No. 232,070, filed 8/15/88, now U.S. Pat. No. 4,888,148.

FIELD OF THE INVENTION

The present invention relates to pipe extruded from mainly amorphous thermoplastic materials having improved properties, particularly impact strength, and methods of making the same. These improvements are achieved by relaxation of internal stress resulting from processing of the thermoplastic material.

BACKGROUND ART

Heretofore, amorphous thermoplastic pipe such as chlorinated polyvinyl chloride ("CPVC") and polyvinyl chloride ("PVC") have been discharged from the extruding apparatus at a size approximating the size of the final product. Since the product undergoes melt swell as the result of viscoelastic recovery after being discharged from the apparatus, the extrudate is pulled from the extruding apparatus at a rate higher than the extrusion rate in order to draw the extrudate to a size more closely corresponding to the final product size. The extrudate is subsequently sized to the final size.

U.S. Pat. No. 4,613,532 to Michel et al teaches that polyamide pipe extrudates may be sized through a die having a diameter in excess of the final product diameter, cooled, and resized adiabatically through a disk having a diameter less than the final diameter.

U.S. Pat. No. 4,152,380 to Graves et al teaches that the inside diameter of extruded plastic pipes and the wall thickness is controlled by the takeaway speed at which the molten plastic pipe is removed from the sizing sleeve.

However, the prior art does not address the problem of internal stresses introduced during extrusion and post extrusion processing.

SUMMARY OF THE INVENTION

It is therefore an aspect of the present invention to provide an amorphous thermoplastic pipe having improved physical properties brought about by the relaxation of internal stress. Significant improvement of physical properties are achieved. These properties include enhanced dimensional stability during heat reversion testing, drop impact strength, and hydrostatic strength. These improved properties are achieved through an extrusion process wherein the material is extruded smaller than the final desired size. The extrudate is subsequently allowed to swell to approximately the final size which thereby allows for the relaxation of internal stresses built up during the processing period. The extrudate is pulled away at approximately the same speed at which it is extruded in order to avoid the reintroduction of stress. If necessary, the extrudate undergoes a final sizing step to bring it to the exact desired dimensions.

DETAILED DESCRIPTION OF THE INVENTION

The present invention relates to amorphous thermoplastic pipe, such as polyvinyl chloride and chlorinated polyvinyl chloride pipe having improved physical properties. By "improved properties" it is meant an improvement in one or more of the following characteristics: reduction in dimensional changes (longitudinal as well as circumferential) following heat reversion testing as described herein; and, as a direct result, improvement in drop impact strength when tested according to ASTM D-2444; as well as improved hydrostatic strength when tesed according to ASTM D-1598. The pipe can be used in conventional applications for extruded polyvinyl chloride and chlorinated polyvinyl chloride pipe such as for instance electrical conduit, water pipe, and pipe used for other fluid media.

The amorphous thermoplastic materials of the present invention generally comprise polyvinyl chloride, chlorinated polyvinyl chloride, and generally all amorphous polymers such as polyvinyl chloride, chlorinated polyvinyl chloride, polystyrene, polymethacrylate, and others, with polyvinyl chloride (PVC) and chlorinated polyvinyl chloride (CPVC) being preferred. Conventional additives can be added in conventional amounts. However, if rubber containing impact modifiers are incorporated in compounds used to make pipe for pressure applications, they should be added at levels low enough to assure a minimum tensile modulus when testing according to ASTM D638 at 23° C. of 400,000 psi for polyvinyl chloride and 360,000 psi for chlorinated polyvinyl chloride. Such levels would be, for example, 0 to 20 percent, and preferably 0 to 10 percent by total weight. Low levels of impact modifiers are desired since, in most cases, these materials lower the tensile modulus of the compound and thereby reduce the hydrostatic strength of the finished pipe.

The thermoplastic material is processed in conventional extrusion machinery such as a twin screw extruder or a single screw extruder. The extruder has a hopper through which the material is charged, an intermediate screw processing portion, and a final die through which the material is discharged in the form of an extrudate. It is further advantageous to use low friction sizing such as gauging discs or the Krauss-Maffei sizing sleeves. The thermoplastics are processed at conventional melt temperatures, which are about 175° C. to about 235° C., and preferably from about 200° C. to about 225° C. for CPVC; and from about 160° C. to about 210° C., and preferably from about 175° to about 200° C. for PVC.

The thermoplastic material is generally processed at conventional throughput rates. The additives would include but not be limited to impact modifiers, stabilizers, lubricants, pigments and colorants, and processing aids.

The extruding apparatus includes a die which in accordance with the present invention is sized so that the inner diameter is an amount X smaller than the final pipe inner diameter where the amount X is approximately equal to the expansion of the inner diameter due to melt swell. Likewise, the outer diameter is an amount Y smaller than the final outer diamter where the amount Y is approximately equal to the expansion of the outer diameter due to the melt swell. Of course, the values of X and Y will depend on many factors such as the recipe of the material, the processing rate, and the equipment. In general, Y will be greater than X since the pipe swells in outer diameter and thickness.

When the extrudate experiences melt swell, the extrudate expands to a size which is substantially that of the final size of the desired product. The exact size of the die must be determined empirically. Typical ranges of melt swell are between 10 and 50 percent by volume for PVC and between 50 and 100 percent by volume for CPVC. This expansion allows for the relaxation of internal stresses which are built up in the thermoplastic material during the processing portion of the extrusion process. It is desired that following melt swell the inner diameter is about 105 to about 112 percent of the final diameter, and preferably from about 105 to about 108 percent of the final diameter, and the outer diameter is similarly about 105 to 112 percent of the final outer diameter and preferably about 105 to about 108 percent of the final diameter. It is desired that the change in the wall thickness of the extrudate during expansion is from about 100 to about 110 percent of the final wall thickness, with from about 100 to about 105 being preferred, and from about 100 to about 103 percent being most preferred.

In order to avoid the build-up of further stresses which are introduced in the known processes by drawing the extrudate at a higher rate of speed than the speed of extrusion, in the present invention the extrudate is drawn at approximately the same rate as it is extruded. It is desirable that the draw or pull rate is no more than 10 percent above the rate at which the pipe is extruded, and more preferably no more than 5 percent above the rate at which it is extruded. It is conventional in the prior process to draw the extrudate at rates of up to two or three times the linear rate at which the extrudate exits from the extruder.

In the present invention, the extruded pipe can be sized to the final desired dimension by means such as vacuum calibration or passing the extrudate through a series of gauging discs. It is preferable to use a low friction method of sizing. The sizing step is generally performed simultaneously with cooling. The cooling can be effected by conventional means such as the use of water, air, or other media.

Commercial pipe dimensions are generally standardized. The present invention is relevant to the full size ranges, but most applicable to pipe sizes of up to two inches in diameter.

The pipe made in accordance with the method of the present invention shows improvement in physical properties as evidenced by improved dimensional stability during heat reversion testing, resistance to drop impact, and hydrostatic pressure. It is desired that the dimensional changes during the heat reversion testing at 30 minutes at 175° C. for CPVC and 150° C. for PVC is no more than about negative 5 percent, and preferably no more than negative 3 percent in the longitudinal direction, and less than about 2.5 and preferably less than 1 percent in the circumferential direction. Improvements in drop impact resistance of up to about 150 percent have been obtained with this method, together with increases in hydrostatic strength. The significance hereby is that, if one would try to improve impact resistance to this degree by adding more impact modifier, the hydrostatic strength would suffer.

EXAMPLES

The following examples show that pipe brittleness may be reduced by the relaxation of internal stresses during the extrusion and sizing process. These stresses consist of two components, one in the axial direction and one perpendicular to it.

Control samples were extruded according to normal production practices, i.e., with extrusion die diameters being equal to the final diameter of the pipe, and including a higher puller speed to control the pipe size. Pipe samples were also extruded in accordance with the invention. Three sizes were tested, including three quarter inch Standard Dimension Ratio 11 ("SDR 11"), one inch Schedule 40 ("SCH 40") and two inch Schedule 80 ("SCH 80"). The pipes were extruded from chlorinated polyvinyl chloride, meeting ASTM cell classification 23447 on a CM 55 conical twin screw extruder. These samples were extruded at throughput rates of about 100 to about 110 lb/hour for the ¾inch, about 120 to about 130 for the 1 inch, and about 130 to about 150 for the 2 inch pipe.

Three tests were performed on the samples including a heat reversion test as follows. A hundred millimeter section is marked in the middle of a six inch length of pipe. The pipe is placed on a talcum dusted plate in an air convection oven and left at about 177° C. ±1° C. for chlorinated polyvinyl chloride and about 150° C. ±1° C. for PVC for 30 minutes. The pipe is then allowed to cool slowly and the distance between the markers is noted. The heating induces relaxation of stress which will generally result in a longitudinal contraction and circumferential expansion. The pipes were further tested as to drop impact using ASTM Test D2444 and as to hydrostatic stress pursuant to ASTM Test D1598. The results of these tests are shown in Table I.

The tests show an improvement in the heat reversion as evidenced by a decrease in the amount of longitudinal shrinkage and a decrease in the amount of circumferential swelling. The pipe in accordance with the invention demonstrated maximum changes of 2 percent in the longitudinal direction and 1.4 percent in the circumferential direction. Pipe of the same size extruded with conventional tooling showed maximum dimensional changes of 12 percent and 5 percent respectively. One inch schedule 40 pipe extruded in the same manner showed an improvement of up to 50 percent in the drop impact and 20 percent in the hoop stress based on 1,000 hour data over pipe extruded using commercial tooling.

TABLE I

| Pipe Size | Heat Reversion 30 Min. at 350° F. Longit. | Circumf. | Drop Impact ft.-Lbs. | Hydrostatic Stress Testing $10^5$ Hr. 50% Conf. psi | Scatter % | Longest Point (Hr.) |
|---|---|---|---|---|---|---|
| ¾" SDR 11, normal production | −12% | +5% | 16.0 ± 1.2 | 1201 | 4.0 | 2265 |
| ¾" SDR 11, low stress | −2% | 0% | 38.0 ± 2.5 | 1251 | 10.0 | 304 |
| 1" Sch. 40, normal production | −12% | +6% | 80.8 ± 9.8 | 1186 | 4.0 | 6408 |
| 1" Sch. 40, low stress | −1% | 0% | 120.8 ± 9.8 | 1337 | 3.2 | 5674 |
| 2" Sch. 80, normal production | −8% | +5% | 76.0 ± 4.3 | 1365 | 8.5 | 219 |

TABLE I-continued

| Pipe Size | Heat Reversion 30 Min. at 350° F. Longit. | Heat Reversion 30 Min. at 350° F. Circumf. | Drop Impact ft.-Lbs. | Hydrostatic Stress Testing $10^5$ Hr. 50% Conf. psi | Hydrostatic Stress Testing Scatter % | Hydrostatic Stress Testing Longest Point (Hr.) |
|---|---|---|---|---|---|---|
| 2" Sch. 80, low stress | −2% | +1.4% | 206.8 ± 0.5 | 1535 | 7.7 | 276 |

While in accordance with the Patent Statutes, the best mode and preferred embodiment has been set forth, the scope of the invention is not limited thereto, but rather by the scope of the attached claims.

What is claimed is:

1. An amorphous thermoplastic pipe having improved impact resistance comprising a pipe of polyvinyl chloride or chlorinated polyvinyl chloride and having a final inner diameter and a final outer diameter defining a wall thickness therebetween, said pipe being discharged from an extruder as an extrudate having an extruded inner diameter smaller than said final inner diameter and an extruded outer diameter smaller than final outer diameter, the internal stresses of said extrudate being dissipated by allowing said extrudate to expand so that the inner diameter is up to about 110 percent of the final inner diameter and the outer diameter is up to about 110 percent of the final outer diameter, and the further introduction of internal stresses being avoided by drawing said extrudate at substantially the same speed as it is discharged, said expanded extrudate being sized to the final inner diameter and outer diameter.

2. An amorphous thermoplastic pipe having improved impact resistance according to claim 1, wherein the pipe is chlorinated polyvinyl chloride.

3. An amorphous thermoplastic pipe having improved impact resistance according to claim 1, wherein the pipe is polyvinyl chloride.

* * * * *